(12) United States Patent
Leclerc

(10) Patent No.: US 7,420,305 B2
(45) Date of Patent: Sep. 2, 2008

(54) MOUNTING FRAME FOR AN ELECTRIC MOTOR AND ELECTRIC MOTOR

(75) Inventor: Thierry Leclerc, La Cluse et Mijoux (FR)

(73) Assignee: Etel S.A., Motiers (CH)

( * ) Notice: Subject to any disclaimer, the term of this patent is extended or adjusted under 35 U.S.C. 154(b) by 43 days.

(21) Appl. No.: 11/477,405

(22) Filed: Jun. 28, 2006

(65) Prior Publication Data
US 2007/0035191 A1    Feb. 15, 2007

(30) Foreign Application Priority Data
Jul. 2, 2005    (DE) ................ 10 2005 030 927

(51) Int. Cl.
*H02K 5/00*    (2006.01)

(52) U.S. Cl. .................................. 310/91; 310/89

(58) Field of Classification Search ............... 310/89, 310/91, 154.08, 154.09, 254, 259; 248/674; 29/596
See application file for complete search history.

(56) References Cited

U.S. PATENT DOCUMENTS

| | | | | |
|---|---|---|---|---|
| 2,544,266 A * | 3/1951 | Kennedy | ................... | 29/592.1 |
| 2,873,082 A | 2/1959 | Gillespie | | |
| 3,445,692 A * | 5/1969 | Kato | ..................... | 310/42 |
| 3,535,573 A | 10/1970 | Appelton et al. | | |
| 4,387,313 A * | 6/1983 | Yamamoto et al. | ............ | 310/71 |
| 5,069,415 A * | 12/1991 | Mechalas | .................... | 248/674 |
| 5,426,337 A * | 6/1995 | Kobayashi et al. | ............ | 310/89 |
| 6,104,109 A * | 8/2000 | Sato | ..................... | 310/40 MM |
| 6,161,274 A * | 12/2000 | Stark et al. | ..................... | 29/596 |
| 6,198,189 B1 * | 3/2001 | Takahashi et al. | ............. | 310/89 |
| 6,342,741 B1 * | 1/2002 | Fukui et al. | ............... | 310/60 A |
| 6,809,446 B2 * | 10/2004 | Yamamoto et al. | ............ | 310/89 |
| 2002/0047385 A1 * | 4/2002 | Fukuda et al. | ................ | 310/89 |
| 2004/0007934 A1 * | 1/2004 | Michaels et al. | ............ | 310/254 |
| 2004/0113504 A1 * | 6/2004 | Agnes et al. | ........... | 310/154.08 |
| 2005/0012420 A1 * | 1/2005 | Kiderman et al. | ............ | 310/162 |
| 2005/0093389 A1 * | 5/2005 | Simofi-Ilyes et al. | ... | 310/154.08 |
| 2005/0189831 A1 * | 9/2005 | Ortt et al. | ............... | 310/154.07 |
| 2005/0223540 A1 * | 10/2005 | Krogen | ........................ | 29/596 |
| 2007/0024135 A1 * | 2/2007 | Simofi-Ilyes et al. | .......... | 310/89 |

FOREIGN PATENT DOCUMENTS

| | | |
|---|---|---|
| DE | 1 803 206 | 12/1959 |
| DE | 88 12 397 U | 9/1989 |
| FR | 1 056 643 | 3/1954 |

* cited by examiner

*Primary Examiner*—Tran Nguyen
(74) *Attorney, Agent, or Firm*—Kenyon & Kenyon LLP

(57) ABSTRACT

A mounting frame for an electric motor includes tabs projecting laterally from the mounting frame for mounting a stator of the electric motor to a mounting surface. Between the tabs, the mounting frame includes stop areas that define the position of the stator with respect to the mounting surface. In an electric motor having such a mounting frame, the frame is connected directly to the core stack of the stator of the electric motor.

20 Claims, 3 Drawing Sheets

MOUNTING FRAME FOR AN ELECTRIC MOTOR AND ELECTRIC MOTOR

CROSS-REFERENCE TO RELATED APPLICATIONS

The present application claims priority to Application No. 10 2005 030 927.5, filed in the Federal Republic of Germany on Jul. 2, 2005, which is expressly incorporated herein in its entirety by reference thereto.

FIELD OF THE INVENTION

The present invention relates to a mounting frame for an electric motor. The present invention additionally relates to an electric motor having such a mounting frame.

BACKGROUND INFORMATION

In order to connect the stator of an electric motor to the user-side mounting surface of an application such that the motor axis stands as perpendicularly as possible on the mounting surface, conventional housings for accommodating such a stator are manufactured by milling, for example. Such housings may be expensive, heavy and take up a lot of space.

U.S. Pat. No. 5,069,415 describes a mounting frame for mounting a motor on a mounting surface. This mounting frame, however, may make it difficult to align the motor exactly with respect to the surface since the position of the motor is defined via several mounting tabs, each of which is individually connected to the mounting frame.

SUMMARY

Example embodiments of the present invention may provide a particularly simple mounting frame for an electric motor, or an electric motor having such a mounting frame, which may be convenient to manufacture and nevertheless may provide an exact alignment of the motor on a mounting surface.

A mounting frame for an electric motor may include tabs projecting laterally from the mounting frame for mounting a stator of the electric motor on a mounting surface. Between the tabs, the mounting frame has stop areas that define the position of the stator with respect to the mounting surface.

In an electric motor having such a mounting frame, the mounting frame is connected directly to the core stack of the stator of the electric motor.

A corresponding mounting frame may be formed in a particularly simple manner from sheet metal made from various materials, such as stainless steel, aluminum, etc., which is stamped or cut into a relatively simple form and is suitably bent. The mounting frame may be particularly light and cost-effective, but nevertheless may allow for precise alignment of the motor with respect to a mounting surface.

According to an example embodiment of the present invention, a mounting frame for an electric motor includes: tabs projecting laterally from the mounting frame adapted to mount a stator of the electric motor on a mounting surface; and stop areas arranged between the tabs adapted to align the stator with respect to the mounting surface.

The tabs, at least in proximity to the stop areas, may be recessed relative to the mounting surface.

The tabs may be flexible.

The mounting frame may be formed of one of (a) cylindrical and (b) block-shaped sheet metal.

The stop areas may be formed by cutting edges of the sheet metal.

The stop areas may be arranged as cut edges of the sheet metal.

The stop areas may be formed by stamping edges of the sheet metal.

The stop areas may be arranged as stamped edges of the sheet metal.

The sheet metal may include slots between the tabs and the stop areas, and a depth of the slots may be greater than a thickness of the sheet metal (1).

The tabs may include openings adapted to accommodate bolts.

The tabs may include openings adapted to accommodate mounting components.

At least one stop area may include a notch adapted to mark an angular position of the stator.

According to an example embodiment of the present invention, a mounting frame for an electric motor includes: tab means projecting laterally from the mounting frame for mounting a stator of the electric motor on a mounting surface; and stop means arranged between the tab means for aligning the stator with respect to the mounting surface.

According to an example embodiment of the present invention, an electric motor includes: a stator; and a mounting frame, a core stack of the stator directly connected to the mounting frame, the mounting frame including laterally projecting tabs adapted to mount the stator on a mounting surface, stop areas arranged between the tabs, the stop areas adapted to align the stator with respect to the mounting surface. Example embodiments of the present invention are described in more detail below with reference to the appended Figures.

DETAILED DESCRIPTION

Figure 1:
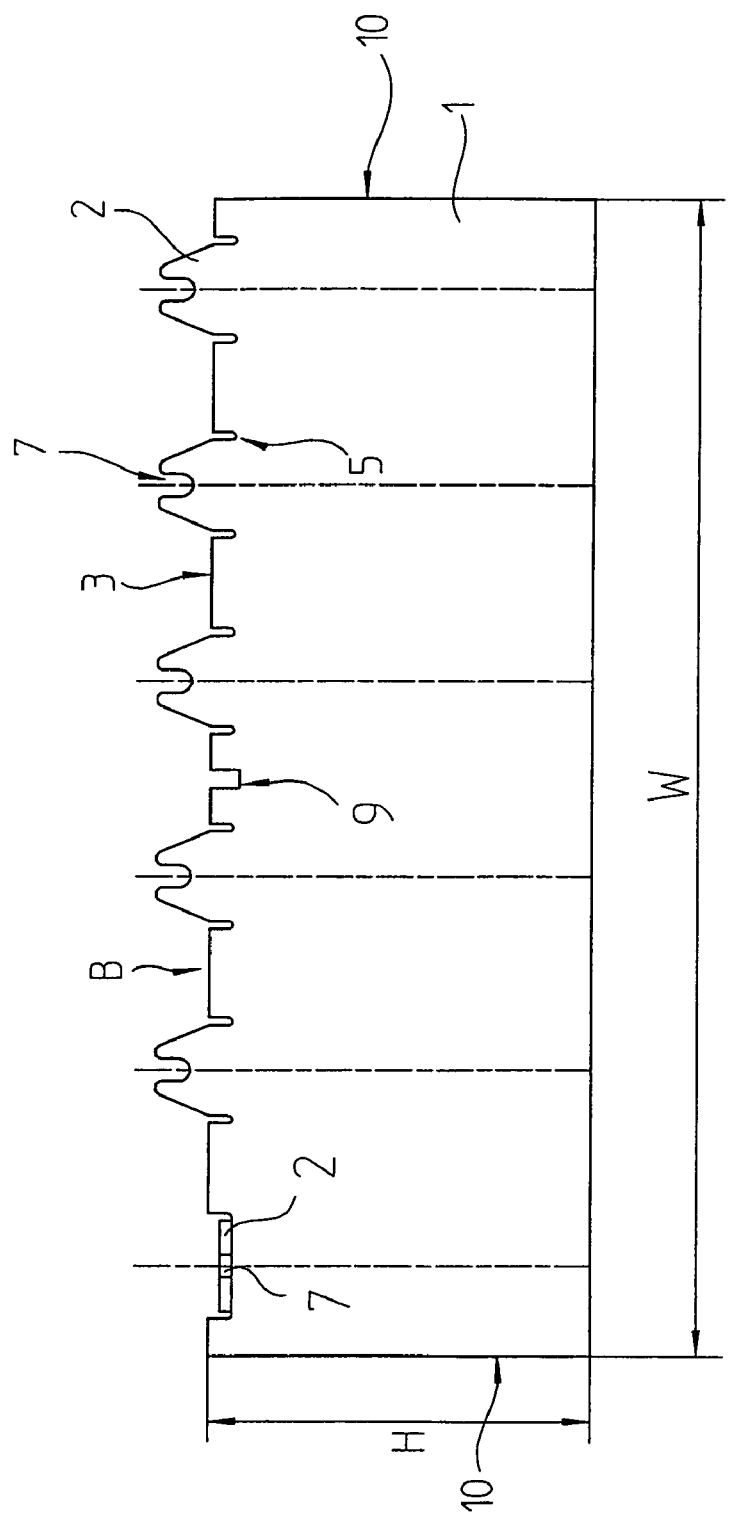
FIG. 1 illustrates an unbent mounting frame.

FIG. 1 illustrates a mounting frame B in the form of stamped or cut sheet metal 1 made of, e.g., stainless steel. Sheet metal 1 is, e.g., approximately 2.5 mm thick and has a substantially rectangular shape. It has a height H, which corresponds approximately to the axial length of the core stack of the electric motor to be mounted. The width W corresponds approximately to the circumference of the stator. The sheet metal also has alternately tabs 2 and stop areas 3 on an edge. Stop areas 3 are later used to provide for the alignment of mounting frame B and thus of the electric motor relative to the mounting surface. Tabs 2 are used to mount mounting frame B on the mounting surface. They therefore have openings 7 that are used to accommodate mounting components, e.g., bolts. Stop areas 3 are formed by cutting edges or stamping edges of sheet metal 1. The required precision in the alignment of mounting frame B and thus of the electric motor mounted in the mounting frame or its stator may thus be achieved in a particularly simple manner by an appropriately precise manufacture of sheet metal 1 and stop areas 3.

On both sides of each tab 2 and as a transition to stop areas 3, sheet metal 1 has slots 5 which are deeper than the thickness of the sheet metal. Tabs 1 may therefore be bent by, e.g., approximately 90 degrees such that the bent-away leg later no longer rests on the mounting surface, but is rather recessed from it. As illustrated in FIG. 1, left tab 2 is already bent over. It is illustrated that it is deeper than stop areas 3.

A notch 9 is used later as a marker for a certain angular position.

Figure 2:
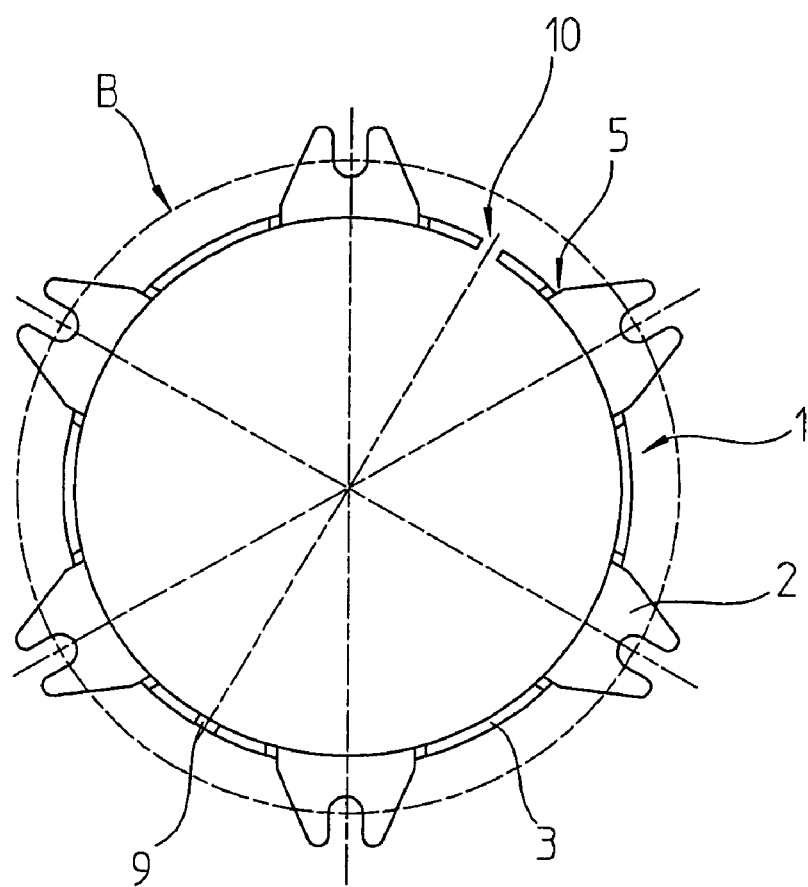
FIG. 2 illustrates a bent mounting frame.

As illustrated in FIG. 2, sheet metal 1 is rolled such that it forms a cylindrical shell for accommodating the cylindrical stator of the electric motor. Tabs 2 are all bent outwardly as illustrated in FIG. 1 with reference to a tab 2 and described above.

The thickness of sheet metal 1 of, e.g., approximately 2.5 mm is a compromise between the stability of mounting frame B and the simple processing of sheet metal 1, e.g., when bending and rolling.

The core stack of the stator may be mounted directly in mounting frame B, for example by bonding, spot welding, bolting, shrink-fitting, etc. Special inserts may be used in stator 8 when bolting since bolting mounting frame B directly to stator 8 may entail the danger of damaging the core stack of stator 8. For shrink-fitting, sheet metal 1 may first be welded to abutting surface 10 or one may start out from an appropriately shaped sheet metal pipe (this represents a possibility for manufacturing mounting frame B in the other instances as well).

Notch 9 is used to set the angular position of the stator in mounting frame 1 in a defined manner. This may be significant for applications in which the commutation angle of the electric motor relative to the mounting position is to remain the same for every supplied motor.

Figure 3:
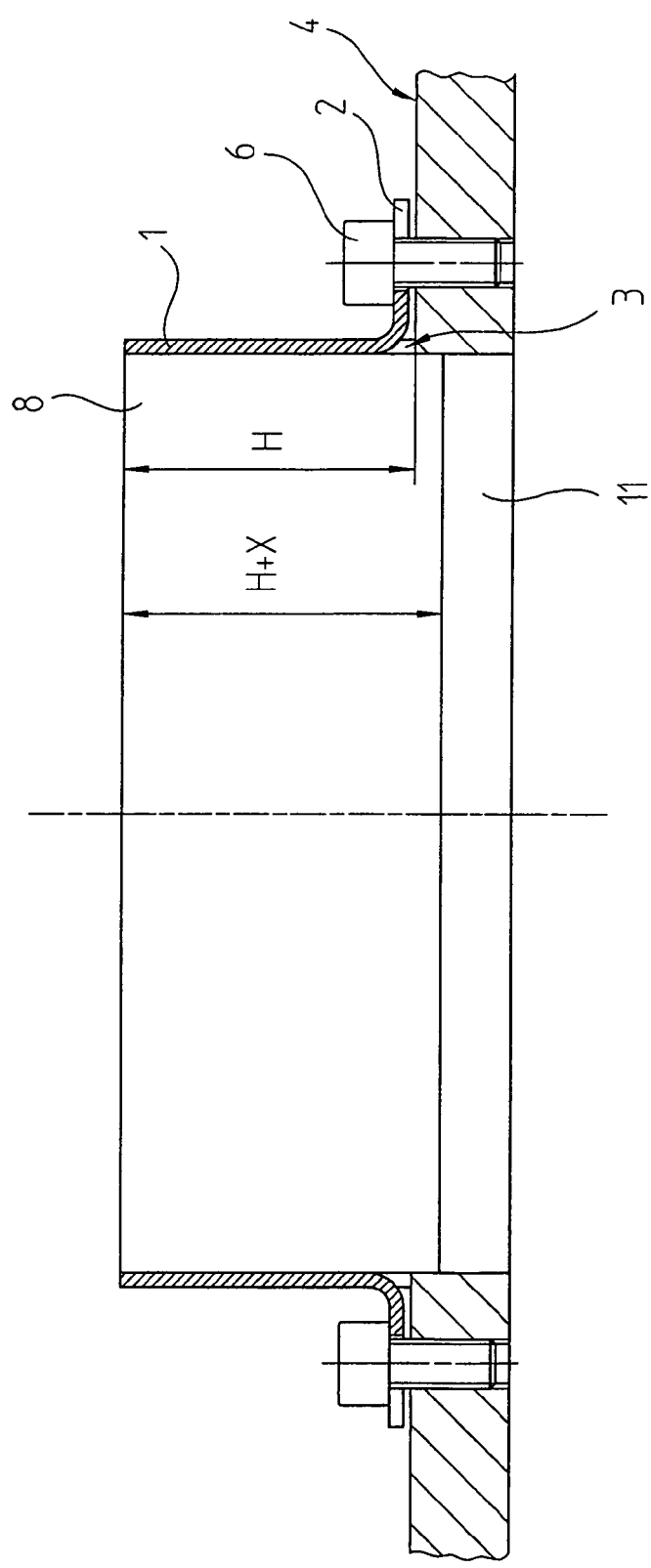
FIG. 3 is a cross-sectional view through a mounting frame, which holds a motor on a mounting surface.

FIG. 3 illustrates a mounting frame 1 together with the electric motor or its stator 8. The axial length of stator 8 is greater by a small amount X than the height H of sheet metal 1. Stator 8 juts out by this amount X from stop areas 3 on the side of tabs 2 and stop areas 3. Mounting frame 1 rests with its stop areas 3 on mounting surface 4 and thus defines the alignment of stator 8 relative to mounting surface 4. Flexible tabs 2 are mounted, e.g., bolted to mounting surface 4 by mounting components, e.g., bolts 6. As a result, tabs 2 press stop areas 3 onto mounting surface 4. Mounting surface 4 has an opening 11, into which stator 8 extends. In this opening 11, stator 8 still has play of, e.g., some tenths of a millimeter such that it may be centered with respect to a rotor, but is not in danger of coming into contact with the rotor or its permanent magnet. This may make mounting the electric motor significantly easier.

A suitable height profile of sheet metal 1 and of stop areas 3 allows for mounting frame B to be adapted to mounting surfaces 4, which may not be plane surfaces.

By mounting mounting frame B directly on the core stack of stator 8 of the electric motor, which may be mounted on a mounting surface in a simple and precise manner, a particularly cost-effective electric motor may be obtained. Mounting frame B also fulfills the task of a protective motor housing. Depending on the application, mounting frame B may hold only stator 8 or also the entire electric motor including stator 8 and rotor, rotor and stator being connected via a bearing. Since in both cases mounting frame B and stator 8 are connected to each other in a rigid manner, the alignment of the one element also aligns the other element.

In the exemplary embodiment described herein, sheet metal 1 is shaped into a cylinder for accommodating a stator 8 having a round cross-section. Sheet metal 1 may also be adapted to other cross-sections, for example a stator having a rectangular cross-section. For this purpose, sheet metal 1 is bent into a rectangular parallelepiped instead of a cylinder.

What is claimed is:

1. A mounting frame for an electric motor, comprising:
   tabs adapted to mount a stator of the electric motor on a mounting surface, each tab having a bent leg projecting laterally outwardly from the mounting frame; and
   stop areas arranged between the tabs adapted to align the stator with respect to the mounting surface;
   wherein the bent legs of the tabs, at least in proximity to the stop areas, are recessed relative to the mounting surface.

2. The mounting frame according to claim 1, wherein the tabs are flexible.

3. The mounting frame according to claim 1, wherein the mounting frame is formed of one of (a) cylindrical and (b) block-shaped sheet metal.

4. The mounting frame according to claim 3, wherein the stop areas are formed by cutting edges of the sheet metal.

5. The mounting frame according to claim 3, wherein the stop areas are arranged as cut edges of the sheet metal.

6. The mounting frame according to claim 3, wherein the stop areas are formed by stamping edges of the sheet metal.

7. The mounting frame according to claim 3, wherein the stop areas are arranged as stamped edges of the sheet metal.

8. The mounting frame according to claim 3, wherein the sheet metal includes slots between the tabs and the stop areas, a depth of the slots greater than a thickness of the sheet metal.

9. The mounting frame according to claim 1, wherein the tabs include openings adapted to accommodate bolts.

10. The mounting frame according to claim 1, wherein the tabs include openings adapted to accommodate mounting components.

11. The mounting frame according to claim 1, wherein at least one stop area includes a notch adapted to mark an angular position of the stator.

12. A mounting frame for an electric motor, comprising:
    tab means for mounting a stator of the electric motor on a mounting surface, the tab means including bent leg means projecting laterally outwardly from the mounting frame; and
    stop means arranged between the tab means for aligning the stator with respect to the mounting surface;
    wherein the bent leg means of the tab means, at least in proximity to the stop means, are recessed relative to the mounting surface.

13. An electric motor, comprising:
    a stator; and
    a mounting frame, a core stack of the stator directly connected to the mounting frame, the mounting frame including tabs adapted to mount the stator on a mounting surface, each tab having a laterally outwardly projecting bent leg, stop areas arranged between the tabs, the stop areas adapted to align the stator with respect to the mounting surface;
    wherein the bent legs of the tabs, at least in proximity to the stop areas, are recessed relative to the mounting surface.

14. The mounting frame according to claim 1, wherein the tabs are adapted to mount the stator of the electric motor on a user-side mounting surface.

15. The mounting frame according to claim 12, wherein the tab means are adapted to mount the stator of the electric motor on a user-side mounting surface.

16. The electric motor according to claim 13, wherein tabs are adapted to mount the stator of the electric motor on a user-side mounting surface.

17. The mounting frame according to claim 1, wherein the bent legs of the tabs are axially offset from the mounting surface.

18. The mounting frame according to claim 12, wherein the bent leg means of the tab means are axially offset from the mounting surface.

19. The electric motor according to claim 13, wherein the bent legs of the tabs are axially offset from the mounting surface.

20. A mounting frame for an electric motor, comprising:

tabs adapted to mount a stator of the electric motor on a mounting surface, each tab having a bent leg projecting laterally outwardly from the mounting frame, the mounting surface including an opening, the stator extending into the opening; and stop areas arranged between the tabs adapted to bear against the mounting surface and align the stator with respect to the mounting surface;

wherein the bent legs of the tabs, at least in proximity to the stop areas, are recessed relative to the mounting surface.

* * * * *